May 8, 1934.  O. CONRADTY  1,957,940
BODY FOR USE IN ELECTROLYSIS
Filed June 4, 1929
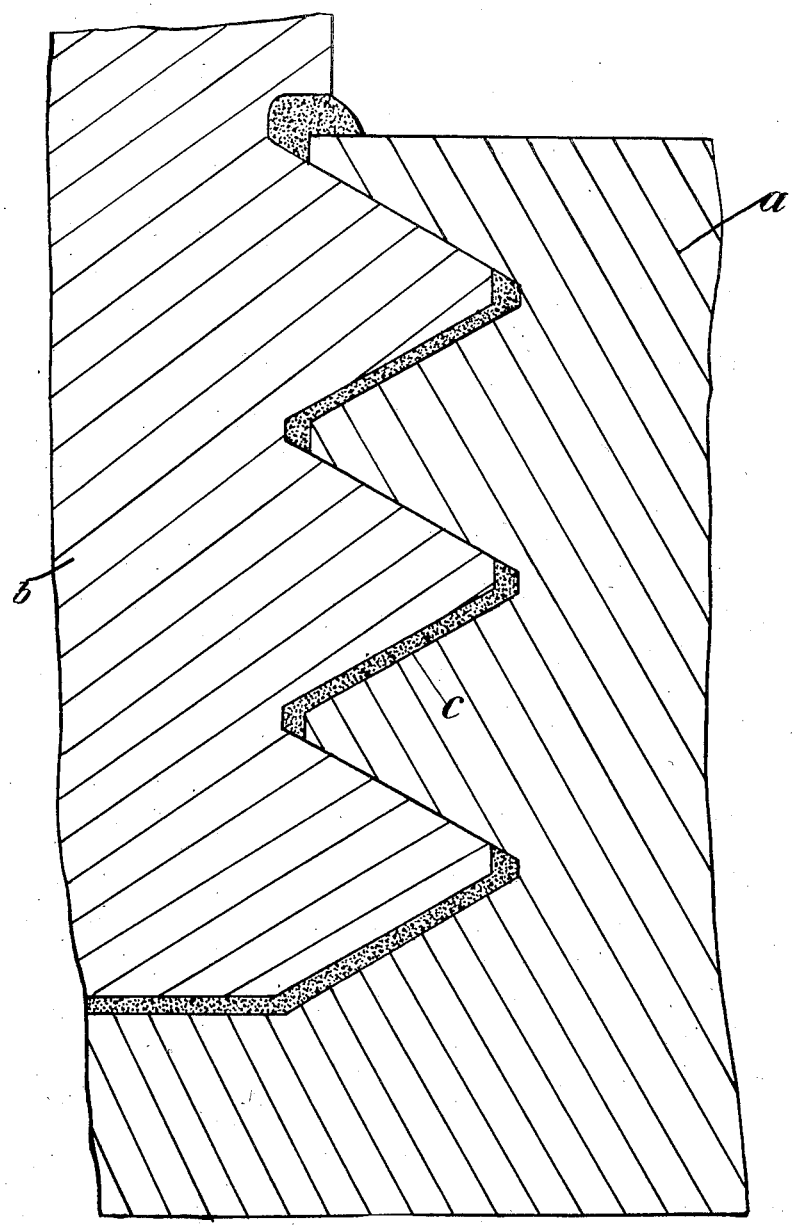
Inventor:
Ottmar Conradty
By
Pennie Davis Marvin + Edmonds Patented May 8, 1934

1,957,940

UNITED STATES PATENT OFFICE 1,957,940

BODY FOR USE IN ELECTROLYSIS

Ottmar Conradty, Nuremberg, Germany

Application June 4, 1929, Serial No. 368,308
In Germany November 23, 1928

3 Claims. (Cl. 204—4)

My invention relates to improvements in bodies for use in electrolysis and the method of manufacturing the same, and more particularly in electrodes used in electrolysis and consisting of graphite plates mounted on graphite rods. As now practised the graphite rods are provided with screw-threaded ends screwing in internally screw-threaded bores of horizontal plates. Experience has shown that in the operation of such electrodes the joint between the plates and the rods is destroyed after comparatively short time by reason of irregular electrolysis taking place at such parts where the plates and the rods are not in close contact with each other. Thereby the screw-threads which are comparatively weak are rapidly corroded, so that the plates or parts thereof fall from the rods before they are completely consumed. When thus a part of the plates falls from the rods the effective area of the electrodes is reduced which results in an increased resistance of the bath and an increase of the current density, whereby the plates are rapidly destroyed and the consumption of graphite is increased.

The object of the improvements is to provide an electrode and a method of manufacturing the same in which the said objections are obviated, and with this object in view my invention consists in providing an electrode in which any spaces between the plates and the rods are avoided by filling the same with a suitable filling medium. In the practice of the invention the said filling medium consists of a material such as wax which is plastic and can be made liquid for example by heating, and which is of a nature such that it is not affected by electrolysis.

For the purpose of explaining the invention a part of an electrode is illustrated in the accompanying drawing showing a sectional elevation of the said part of the electrode.

In carrying out the invention a suitable filling medium such as wax, ceresin, etc. or mixtures of different sorts is molten, the rods are heated particularly at the screw-threaded ends and coated with the said ceresin. Thereafter, the rods are screwed into the holes made in the plates, which are likewise heated, the screw-threaded ends of the rods being preferably highly heated immediately before screwing the same into the holes by means of a soldering flame in order to make the coating as fluent as possible. Wax or mixtures thereof of the character indicated are not made perfectly fluent by being heated so that the material is not completely absorbed by the graphite but there remains a thin coating on the screw-threads.

By rapidly and tightly screwing the rods into the bores an intimate contact is produced between the surfaces of the threads, and simultaneously the wax adhering to the threads is pressed away thus collecting within the small interstices formed at the bottom side of the threads of the rods and completely filling the same where it is solidified. In the figure the letter $a$ indicates the plate, the letter $b$ the rod, and the letter $c$ indicates the filling of solidified wax between the bottom faces of the threads of the rod $b$ and the adjacent faces of the threads of the plates $a$. As appears from the figure, all the interstices between the rod and the plate are completely filled, so that there is no electrolysis at such parts which would destroy the threads. I have found that by thus constructing the electrodes the plates are not liable to fall from the rods, and that electrodes made according to my improved method can be almost completely used up, which results in a considerable saving of expensive graphite material. Further, I have found that the resistance between the plate and the rod is not increased, and that as a matter of fact the average initial voltage of the bath is reduced by a few tenths of a volt, and that thereafter in the course of the operation the voltage of the bath is considerably reduced as compared to electrodes now in use, the reason being that from the beginning the objectionable electrolysis which consumes electric energy is obviated. Heretofore the said objectionable electrolysis used to increase in the course of the operation, because thereby the contacting surfaces of the rod and the plate were reduced.

For further reducing the resistance between the plate $a$ and the rod $b$ I use a wax which is filled with a suitable conducting material such for example as finely ground graphite, the said graphite being adapted to render the filling material more or less conductive.

I claim:

1. The herein described body for use in electrolysis comprising a plate formed with an internally screw-threaded bore, a rod screwing in the said bore, and adapted to support said plate, and wax in mixture with ground graphite filling the interstices between the upper sides of the screw-threads of the plate and the under sides of the screw threads of the rod.

2. The method of making a body for use in electrolysis substantially invulnerable to local electrolyses, comprising taking a plate of graphite, making a screw-threaded bore in the plate, applying a coating of wax to the end of the graphite rod, heating the plate and heating the end of the rod, and screwing the rod into said bore, whereby the wax filling material will fill the interstices between the upper sides of the screw threads of the plate and the under sides of the rod.

3. The herein described body for use in electrolysis, comprising a plate formed with an internally screw-threaded bore, a rod screwing in the said bore, and adapted to support said plate, and a wax filling in the interstices between the upper sides of the screw-threads of the plate and the under sides of the screw threads of the rod.

OTTMAR CONRADTY.